Jan. 29, 1974 J. D. MARGERUM 3,788,858

PHOTOPOLYMERIZATION SYSTEMS WITH TETRAZOLIUM SALT

Filed Oct. 2, 1972

3,788,858
PHOTOPOLYMERIZATION SYSTEMS WITH TETRAZOLIUM SALT

John D. Margerum, Woodland Hills, Calif., assignor to Hughes Aircraft Company, Culver City, Calif.

Continuation-in-part of abandoned application Ser. No. 227,955, Feb. 22, 1972. This application Oct. 2, 1972, Ser. No. 294,037
Int. Cl. G03c *1/70*
U.S. Cl. 96—115 P 7 Claims

ABSTRACT OF THE DISCLOSURE

Photopolymerizable systems which combine an aromatic-substituted tetrazolium salt with a compound that is photopolymerizable by ultraviolet light are effective for initiating and effecting imaging recordings and for lithographic purposes.

RELATED APPLICATION

This application is a continuation-in-part of my copending application Ser. No. 227,955, filed Feb. 22, 1972, and now abandoned.

BACKGROUND OF THE INVENTION

Field of the invention

The invention is concerned with photopolymerizable systems in either solution or film form. The systems contain a photopolymerizable compound and an aromatic-substituted tetrazolium salt, preferably in combination with an electron donating catalyst. These systems are particularly useful in effecting imaging photopolymerization, and are also useful in lithographic operations.

DESCRIPTION OF THE PRIOR ART

The photopolymerization of systems which utilize compounds containing a vinyl group and like systems are known. Such systems include a photopolymerization initiator such as a dye or a mild reducing agent and other agents for effecting light polymerization. U.S. patents which disclose such systems are Oster 2,875,047, 2,996,-381, 3,850,445, Martins' Pats. 2,902,365, 2,892,716 and 2,927,022, Bach 3,419,394, Ream et al. 3,403,116, Sites et al. 3,047,422, and Honjo 3,428,453. In addition, there have been some recent developments which effect more rapid imaging photopolymerization of known systems. These developments combine polymerizable compounds with a dye and a sulfinic catalyst, and they have been disclosed in U.S. Pat. 3,573,922. A new photopolymerizable combination of vinyl systems with a combined catalyst of a photo-oxidant and phosphine or arsine is disclosed in U.S. Pat. 3,649,495.

SUMMARY OF THE INVENTION

This invention is concerned with the photochemical reactivity of systems which combine a photopolymerizable compound with an aromatic-substituted tetrazolium salt, preferably with an electron donating catalyst. It is also concerned with the use of these novel systems in image recording by means of ultraviolet light and in the production of both positive working and negative working photolithographic plates.

BRIEF DESCRIPTION OF THE DRAWINGS

In FIG. 1 there is illustrated a backing substrate member 10 provided with a solid 11 coating by photopolymerization and solvent development of a system of this invention. The substrate may be of any suitable metal, plastic or conventional backing upon which the photopolymerized composition 11 is coated.

In FIG. 2 there is illustrated transparent plates 12 and 13 of glass or plastic between which is sealed by means of sealing tape 14 a system of this invention. This structure can be used to record photopolymer images, for example, in the recording of holographic images.

In FIG. 3 there is illustrated a substrate 10' coated with a thin resin layer 15, such as a urea-formaldehyde resin layer or film. A film layer 16 of cross-linked polyacrylic acid overlies layer 15, and this is covered by coating 17 of photopolymerizable composition as metal acrylate. A surface layer 18 overlies coating 17; said surface layer 18 is a photopolymerizable oleophilic layer of this invention.

Figure 1:
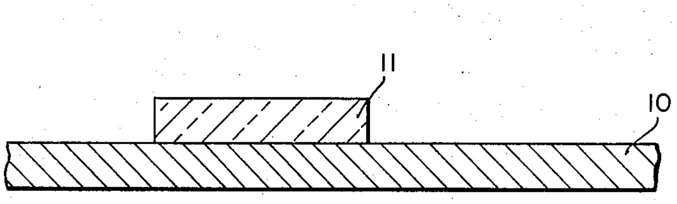
FIG. 1 is a cross-sectional view illustrating a lithographic plate provided with a tetrazolium salt initiated photopolymer image as embodied herein.
Figure 2:
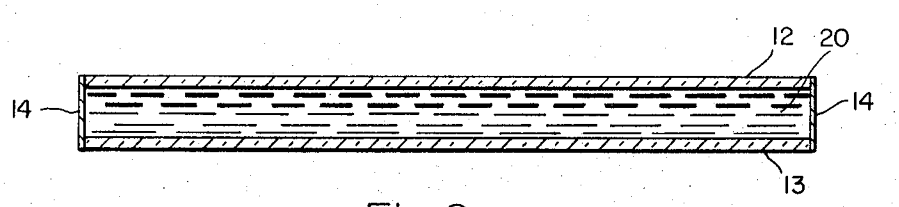
FIG. 2 is a cross-sectional view of a contained photopolymerizable system as disclosed and embodied herein.
Figure 3:
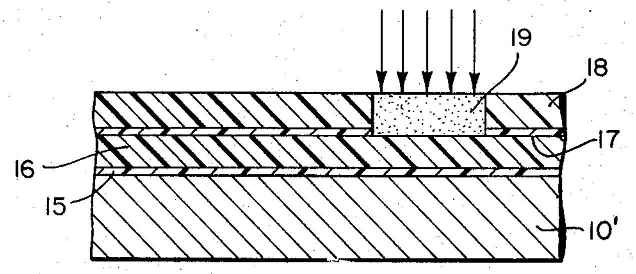
FIG. 3 is illustrative of a multiple coated lithographic plate.

The area 19 is representative of an ultraviolet activated area producing a desired design in surface layer 18 with coating 17. The double coating may be in a reverse order, with suitable transparencies for passage of light rays. Multiple coatings of the present systems may also be used.

DESCRIPTION OF THE INVENTION

The photopolymerizable compounds which may be used within the scope of the present invention are those compounds which have generally been used for this purpose in other systems. These compounds generally will contain a vinyl group such as a metal acrylate, acrylic acid, esters of acrylic acid, and partially polymerized forms of the same. Selection of the photopolymerizable compound will depend, at least in part, upon the particular application. For example, polymerization or cross-linking of an oleophilic monomer can be used to produce a negative working photolithographic plate, whereas polymerization of a hydrophilic monomer can be used to make a positive working photolithographic plate.

The tetrazolium salts which may be used within the scope of this invention are those which have at least one aryl substituent. A preferred class of compounds are those in which the three substituents on the ring system are all aryl, particularly phenyl. Typical examples of such salts are 2,3,5-triphenyl-2H-tetrazolium chloride (TTC), 3,3'-(4,4'-biphenylene)-bis (2,5-diphenyl-2H-tetrazolium chloride) (NeoTC), 3,3'-(3,3'-dimethoxy-4,4'-biphenylene)-bis (2,5-diphenyl-2H-tetrazolium chloride) (BTC). Selection of the particular salt will depend in part on the solvent employed. Many of the salts are water-soluble. Others are less soluble in water and may need the presence of an organic solvent to get a sufficient amount into solution.

Ultraviolet exposures of tetrazolium salts cause photochemical reactions which initiate polymerization, and such salt may be used as the base for photolithographic systems. Although the excited state reactions of tetrazolium salts are not known in detail, ultraviolet photoredox reactions occur to effect image recording by photopolymerization of polymerizable systems.

For example, in solution or semi-solid film form, 2,3,5-triphenyl-2H-tetrazolium chloride is converted by ultraviolet exposure to an insoluble, red-colored triphenylformazan and 2,3-(2,2'-biphenylene)-5-phenyltetrazolium chloride, as follows:

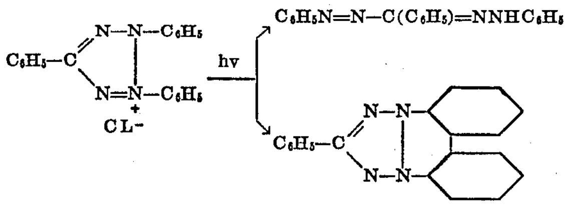

Thus, the photochemical reactivity of the tetrazolium salts can be utilized in solution or relatively solid film form for recording by photopolymerization, and for lithographic purposes. In a photopolymerizable system, the ultraviolet activated photoredox reaction produces free radicals that initiate polymerization, and the formazans that are produced are both highly colored and insoluble in water. Lithographic systems may be based on the formation of insoluble polymers of an appropriate type. The change from a hydrophilic tetrazolium salt to a formazan, has two advantages; the color change indicates the exposed areas, and the change in structure gives the polymers a hydrophobic character.

The introduction of an electron-donating organic catalyst renders the system more sensitive to photopolymerization. Useful catalysts for this purpose are compounds such as organic sulfinates, pentanedione, dimethyl cyclohexane dione, organic phosphines, and organic arsines. The phosphines and arsines are not particularly soluble in water but can be used by adding an organic solvent to the system. For example, when the sulfinates are added, the resultant combination acts as a photoredox system which speeds up the formation of insoluble formazans and also rapidly initiates polymerization of the system.

A preferred class of catalysts are benzene sulfinates. Such catalysts correspond to formula:

wherein R is H, Cl, Br, alkyl having 1 to about 6 carbon atoms, monoalkylamino having 1 to about 6 carbon atoms, or dialkylamino having 1 to about 6 carbon atoms, and X is a metal cation, such as Na or K.

In a preferred system, the tetrazolium salts in combination with a benzene sulfinate forms a quaternary compound corresponding to the formula:

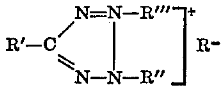

wherein $R^-$ is a benzene sulfonyl radical corresponding to formula set forth above, and R', R'' and R''' are alkyl, aryl or heterocyclic. Especially effective systems are those in which R', R'' and R''' are aryl, such as phenyl, methyl phenyl, methoxy phenyl, and similar groups.

The photopolymerizable systems of the present invention may be in semisolid or solvent form. It is important that the photopolymerizable compound and the tetrazolium salt be intimately mixed. This is readily accomplished if the photopolymerizable compound is a liquid or a semisolid, e.g., Ba-Pb acrylate or Ba-Sr acrylate. A gelling agent may be used. Otherwise, the components may be dissolved in a solvent such as water.

The system may be cast in film form by conventional means onto a surface, and the supported film can be exposed to ultraviolet light to form an image in the resultant film.

The following examples are used to illustrate the present invention.

EXAMPLE 1

Exposure of 2,3,5-triphenyl-2H-tetrazolium chloride in neat acrylonitrile to ultraviolet light produced a polymer precipitate in two minutes of exposure.

EXAMPLE 2

An aqueous solution containing 2.8 M Ba(acrylate)$_2$ and 0.7 M Pb(acrylate)$_2$ and 5 percent by weight 2,3,5-triphenyl-2H-tetrazolium chloride based on the weight of the acrylate compounds was cast to form a BaPb-acrylate film containing about 5 percent of the tetrazolium salt. After two minutes of exposure to ultraviolet light, a red colored polymer was formed.

EXAMPLE 3

A 1 ml. solution in dimethyl formamide was prepared, having 0.1 M tetrazolium salt used in Example 1 and 0.01 M sodium p-toluene sulfinate. This solution was then added to five milliliters of 2 M barium acrylate solution containing 3 percent gelatin by weight. Films were cast on glass plates and allowed to dry. Near ultraviolet exposures as short as 8 seconds caused polymerization and produced some red color. The exposure energy was in the range of 340–410 nm., peaking at about 367 nm. and was approximately 0.28 w./cm.$^2$.

Pertinent applications depend largely upon the selected monomer system in which the ultraviolet exposure of the polymerization or crosslinking of an oleophilic monomer produces a negative working photolithographic plate. Polymerization of a hydrophilic monomer, like barium acrylate, makes a positive working photolithographic plate. The barium acrylate films can also be used for a range of other photopolymer imaging applications, including solvent developed (e.g., water developed) photopolymer images of various types.

What is claimed is:

1. A photopolymerizable system comprising a compound which is polymerizable by ultraviolet light and a tetrazolium salt having at least one aryl substituent.

2. A system of claim 1 wherein the tetrazolium salt corresponds to the formula

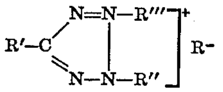

wherein R', R'', and R''' are alkyl, aryl, or heterocyclic, at least one of them being aryl, and $R^-$ is a benzene sulfonyl radical.

3. A system of claim 2 wherein R', R'' and R''' are each aryl.

4. A system of claim 3 wherein R', R'' and R''' are each phenyl.

5. A system of claim 4 wherein the compound is a vinyl monomer.

6. A system of claim 5 wherein the $R^-$ radical is a benzene sulfonyl radical.

7. A system of claim 6 wherein $R^-$ is benzene sulfonyl.

References Cited

UNITED STATES PATENTS

| | | | |
|---|---|---|---|
| 3,503,741 | 3/1970 | Wilson et al. | 96—20 |
| 3,573,922 | 4/1971 | Rust | 96—35.1 |
| 3,420,664 | 1/1969 | Dersch et al. | 96—109 |
| 3,576,638 | 4/1971 | Tuites et al. | 96—109 |

RONALD H. SMITH, Primary Examiner

U.S. Cl. X.R.

96—33, 115 R; 204—259.23, 159.24